United States Patent [19]

Wada

[11] Patent Number: 4,927,170

[45] Date of Patent: May 22, 1990

[54] SUSPENSION CONTROL APPARATUS FOR AN AUTOMOTIVE VEHICLE

[75] Inventor: Shunichi Wada, Himeji, Japan

[73] Assignee: Mitsubishi Denki Kabushiki Kaisha, Tokyo, Japan

[21] Appl. No.: 320,435

[22] Filed: Mar. 8, 1989

[30] Foreign Application Priority Data

Mar. 8, 1988 [JP] Japan .................................. 63-55262

[51] Int. Cl.$^5$ ............................................. B60G 17/00
[52] U.S. Cl. .................................... 280/707; 180/41; 280/840
[58] Field of Search ................ 280/707, 703; 180/840, 180/6.1, 41

[56] References Cited

U.S. PATENT DOCUMENTS

| | | | |
|---|---|---|---|
| 3,124,368 | 3/1964 | Corley et al. | 280/840 |
| 3,881,736 | 5/1975 | Wilfert | 280/6.1 |
| 4,718,695 | 1/1988 | Kawagoe | 280/707 |
| 4,733,875 | 3/1988 | Azuma et al. | 280/707 |
| 4,778,156 | 10/1988 | Imaizumi et al. | 280/707 |
| 4,805,101 | 2/1989 | Dietrich et al. | 280/707 |

OTHER PUBLICATIONS

International Publication No. WO84/02886 Laid Open to Public on Aug. 2, 1984.
PCT Application Serial No. PCT JP88/00754–National Phase Documents Submitted Mar. 6, 1989.

*Primary Examiner*—Richard A. Bertsch
*Attorney, Agent, or Firm*—Sughrue, Mion, Zinn, Macpeak & Seas

[57] ABSTRACT

A suspension control apparatus for an automotive vehicle has a plurality of suspension units which are disposed between each of the wheels of the vehicle and the vehicle body. An acceleration sensor measures the lateral acceleration of the vehicle body. A contol unit corrects the output of the acceleration sensor for drift of the neutral point of the sensor from a prescribed value. Based on the corrected output, the control unit controls the suspension units so as to suppress rolling of the vehicle body.

7 Claims, 5 Drawing Sheets

SUSPENSION CONTROL APPARATUS FOR AN AUTOMOTIVE VEHICLE

BACKGROUND OF THE INVENTION

This invention relates to a suspension control apparatus for an automotive vehicle, and more particularly, it relates to a suspension control apparatus which can suppress rolling, nosediving, and vertical motions of a vehicle so as to provide a more comfortable ride.

During the operation of an automotive vehicle, the vehicle is subjected to accelerations in various directions due to braking, turning, changes in speed, and irregularities in the road surface which cause the vehicle body to undergo rolling, pitching, and heaving motions. These motions impart an unpleasant sensation to the passengers of the vehicle. Accordingly, in recent years, there have been proposals for suspension systems which can suppress these motions and provide a more comfortable ride.

Japanese Published Unexamined Utility Model Application No. 61-163710 and Japanese Published Unexamined Patent Application No. 62-34808 disclose suspension devices in which a fluid spring chamber such as an air spring chamber is disposed between the wheels and the body of a vehicle. By controlling the supply of compressed air to the fluid spring chambers, rolling of the vehicle body can be suppressed. For example, during turning, the suspension units on the opposite side of the vehicle from the direction of turning normally attempt to contract, while the suspension units on the same side as the direction of turning attempt to expand, resulting in rolling motion. In order to suppress this motion, a set amount of compressed air is supplied to the fluid spring chambers of the suspension units which tend to contract, and a set amount of compressed air is discharged from the fluid spring chambers of the suspension units which tend to expand. As a result, the vehicle body is tilted back from the direction of tilting caused by the turn, and the vehicle body is maintained horizontal.

Many other systems have been proposed for suppressing vehicle motions, such as systems which vary the damping force of suspension units and systems which control the action of stabilizers.

In systems which suppress rolling motions by adjusting the supply of compressed air to suspension units, the supply of air is controlled in accordance with the lateral accelerations of the vehicle as sensed by an acceleration sensor. It is therefore important that the acceleration sensor be accurately calibrated. However, the neutral point of the output of an acceleration sensor (the output corresponding to no acceleration) can vary from its initial value over long periods of time, and if this drift is not compensated for, roll suppression can not be accurately performed.

SUMMARY OF THE INVENTION

Accordingly, it is an object of the present invention to provide a suspension control apparatus which can automatically correct the output of an acceleration sensor for drift so as to enable roll suppression to be accurately performed over long periods of time.

In the present invention, a vehicle body is supported by a plurality of adjustable suspension units which are controlled by a control unit in accordance with the output of an acceleration sensor. The control unit automatically determines the drift of the neutral point of the acceleration sensor from a predetermined value and corrects the output of the acceleration sensor for this drift so as to obtain a corrected value indicating the true acceleration of the vehicle body. The suspension units are then controlled in accordance with this corrected value so as to suppress motion of the vehicle body caused by the acceleration.

A suspension control apparatus in accordance with the present invention comprises attitude-adjusting means for adjusting the attitude of a vehicle body, an acceleration sensor which senses the acceleration of the vehicle body and produces a corresponding output signal, correcting means for correcting the output of the acceleration sensor for drift of its neutral point from a predetermined value, and control means for controlling the attitude-adjusting means in accordance with the corrected output of the acceleration sensor so as to suppress a motion of the vehicle body caused by the acceleration which is sensed by the acceleration sensor.

In a preferred embodiment, the attitude-adjusting means comprises air suspension units which can be made to expand or contract by controlling the supply of compressed air thereto.

In a preferred embodiment, the acceleration sensor is disposed so as to detect lateral accelerations of the vehicle, and the control means is a control unit which controls the air suspension units so as to suppress rolling of the vehicle. However, by suitable positioning of the acceleration sensor, the present invention can be employed to suppress rolling, pitching, or heaving of a vehicle body.

BRIEF DESCRIPTION OF THE DRAWINGS

In the drawings, the same reference numerals indicate the same or corresponding parts.

DESCRIPTION OF THE PREFERRED EMBODIMENT

Figure 1:
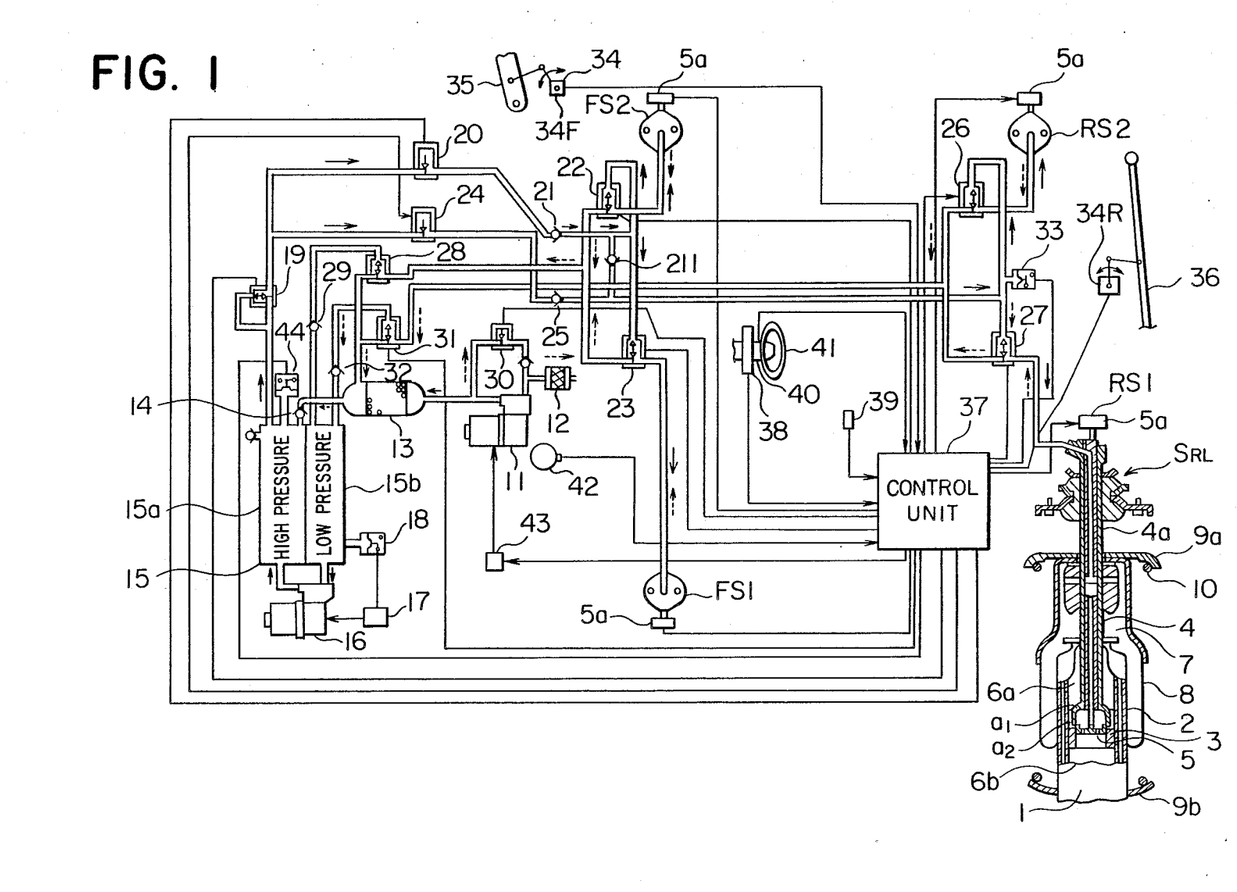
FIG. 1 is a schematic view of one embodiment of a suspension control apparatus in accordance with the present invention.

A preferred embodiment of a suspension control apparatus in accordance with the present invention will be now be described while referring to the accompanying drawings, FIG. 1 of which is a schematic illustration of this embodiment. As shown in FIG. 1, four air suspension units FS1, FS2, RS1, and RS2 are connected between the unillustrated body of an automotive vehicle and the four unillustrated wheels thereof. Units FS1 and RS1 are mounted on the front and rear left wheels, and units FS2 and RS2 are mounted on the front and rear right wheels, respectively. All four air suspension units have nearly the same structure, so except when the front and rear units need to be distinguished from one another, all the air suspension units will be referred to simply by the letter S.

Each of the air suspension units S has a strut-type shock absorber 1 built into it. Each shock absorber 1 has a cylinder 2 which is mounted on one of the wheels and a piston 3 which can freely slide inside the cylinder 2. The cylinder 2 moves up and down with respect to a piston rod 4 in accordance with the up and down movement of the wheel, whereby it effectively absorbs shocks. Element number 5 is a damping force selector valve whose rotation is controlled by an actuator 5a. By rotating the damping force selector valve 5, it is possible to switch between a hard state in which a first damping chamber 6a and a second damping chamber 6b are connected by a single orifice a1, and a soft state in which the damping chambers 6a and 6b are connected by both orifice a1 and another orifice a2. The operation of the actuator 5a is controlled by a control unit 37 to be described further on.

A main air spring chamber 7 which also serves as a fluid chamber for adjusting the vehicle height is disposed at the top portion of the shock absorber 1 in a coaxial relationship with the piston rod 2. A portion of the main air spring chamber 7 is formed from a bellows 8. The piston rod 4 can be raised and lowered by supplying or discharging air to and from the main air spring chamber 7 through a passageway 4a which is formed in the piston rod 4.

An upwards-facing spring bearing 9b is secured to the outer wall of the lower end of the shock absorber 1, and a downwards-facing spring bearing 9a is secured to the outer wall of the main air spring chamber 7. A helical spring 10 is disposed between these spring bearings 9a and 9b.

A compressor 11 compresses air from the atmosphere which enters it through an air cleaner 12. The compressed air is then passed through a dryer 13 which is filled with silica gel or other desiccant. After being dried, the compressed air passes through a check valve 14 and accumulates in a high-pressure chamber 15a of a reserve tank 15. The reserve tank 15 also has a low-pressure chamber 15b which is separated from the high-pressure chamber 15a. Another compressor 16 which is controlled by a compressor relay 17 is connected between the high-pressure chamber 15a and the low-pressure chamber 15b of the reserve tank 15. The compressor relay 17 operates in response to a pressure-sensitive switch 18 which adjoins the low-pressure chamber 15b of the reserve tank 15 and which turns on when the pressure in the low-pressure chamber 15b exceeds atmospheric pressure. When the pressure-sensitive switch 18 turns on, compressor relay 17 closes and compressor 16 is driven. Compressor 16 draws air from the low-pressure chamber 15b, compresses it, and transfers the compressed air to the high-pressure chamber 15a. As a result, the pressure in the low-pressure chamber 15b is always maintained at a level no higher than atmospheric pressure.

The suspension units S are connected to the high-pressure chamber 15a of the reserve tank 15 by piping through which they are supplied compressed air which flows in the directions shown by the solid arrows in FIG. 1. Compressed air from high-pressure chamber 15a passes along the piping through an air supply flow control valve 19 in the form of a three-way valve to be described further on, and a front wheel air supply solenoid valve 20, a check valve 21, and a front right solenoid valve 22 and/or a front left solenoid valve 23, from which it is supplied to the front right suspension unit FS2 and/or the front left suspension unit FS1. In the same manner, after passing through the air supply flow control valve 19, compressed air from the high-pressure chamber 15a flows through a rear wheel air supply solenoid valve 24, a check valve 25, and a rear right solenoid valve 26 and/or a rear left solenoid valve 27, from which it is supplied to the rear right suspension unit RS2 and/or the rear left suspension unit RS1. The downstream side of check valve 21 and the downstream side of check valve 25 are connected by piping through another check valve 211.

On the other hand, the flow paths of discharge air from the suspension units S through piping which connects the suspension units S with the low-pressure chamber 15b are shown by the dashed arrows in FIG. 1. Namely, discharge air from front suspension units FS1 and FS2 passes through solenoid valves 22 and 23 and a front air discharge valve 28. From the front air discharge valve 28, the discharge air can either pass through a residual pressure valve 29 and enter the low-pressure chamber 15b, or it can pass through the dryer 13, an air discharge solenoid valve 30, and the air filter 12 to be discharged into the atmosphere. In addition, discharge air from rear suspension units RS1 and RS2 passes through solenoid valves 26 and 27 and a rear air discharge valve 31. From the rear air discharge valve 31, the discharge air can either pass through a residual pressure valve 32 into the low-pressure chamber 15b, or it can pass through the dryer 13, the air discharge solenoid valve 30, and the air filter 12 from which it is discharged into the atmosphere. When the pressure in the low-pressure chamber 15b is lower than the pressure in the main air spring chambers 7, the residual pressure valves 29 and 32 open, and when the pressure in the low-pressure chamber 15b is higher than the pressure in the main air spring chambers 7, the residual pressure valves 29 and 32 close. A pressure-sensitive switch 33 is disposed in a connecting passageway which communicates between solenoid valves 26 and 27, and it communicates with the main air spring chambers 7 for the rear wheels. The pressure-sensitive switch 33 produces an output signal which is input to the control unit 37.

A vehicle height sensing mechanism 34 comprises a front vehicle height sensor 34F which is mounted on a lower control arm 35 on the front right side of the suspension of the vehicle and which detects the height of the front of the vehicle, and a rear vehicle height sensor 34R which is mounted on a lateral rod 36 of the rear left side of the suspension and which senses the height of the rear of the vehicle. Each of the sensors 34F and 34R of the vehicle height sensor 34 detects the distance from a normal vehicle height and a low vehicle height or a high vehicle height and produces a corresponding output signal, which is input to the control unit 37. The difference between the heights of the front right end and the rear left end of the vehicle is used to determine the lateral inclination of the vehicle body after the heights of the front and rear ends of the vehicle body have been adjusted.

A vehicle speed sensor 38 is housed inside a speedometer. This sensor 38 detects the vehicle speed and produces a corresponding output signal which is supplied to the control unit 37.

Figure 2:
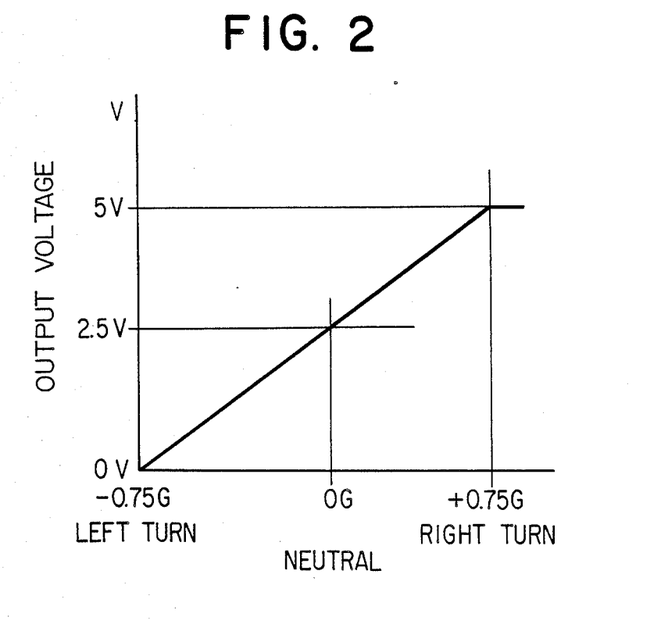
FIG. 2 is a graph of the output voltage of the acceleration sensor 39 of the embodiment of FIG. 1 as a function of lateral acceleration.

A vehicle attitude sensor which detects changes in the attitude of the vehicle body is provided in the form of an acceleration sensor 39. The acceleration sensor 39 need not be of any particular type, but in the present embodiment, it is a differential transformer-type acceleration sensor. It is disposed so as to detect lateral accelerations of the vehicle. FIG. 2 illustrates an example of the output characteristics of the acceleration sensor 39. When the vehicle is traveling straight ahead and there are no lateral accelerations, it produces an output voltage of +2.5 volts, which is used as a neutral point. When a right turn is performed, the output voltage increases linearly with the acceleration, and when a left turn is performed, the output voltage decreases linearly. The derivative with respect to time of the output voltage V is proportional to the angular speed with which a steering wheel is turned.

A steering sensor 40 which detects the rate of rotation of a steering wheel 41, i.e., the rate of steering is mounted on the steering wheel 41. It produces a corresponding output signal which is input to the control unit 37. A throttle opening sensor 42 which detects the angle of depression of an unillustrated accelerator pedal of the vehicle is provided. It produces a corresponding output signal which is input to the control unit 37. Compressor 11 is controlled by a compressor relay 43, which in turn is controlled by a control signal from the control unit 37. A pressure-sensitive switch 44 which turns on when the pressure in the high-pressure chamber 15a falls below a prescribed level is mounted on the high-pressure chamber 15a. It produces an output signal which is input to the control unit 37. When the pressure within the high-pressure chamber 15a falls below a prescribed level, pressure-sensitive switch 44 turns on, and compressor relay 43 is closed by the control unit 37. As a result, compressor 11 is driven, compressed air is sent to the high-pressure chamber 15a, and the pressure in the high-pressure chamber 15a is raised to at least the prescribed level.

Figures 3A, 3B:
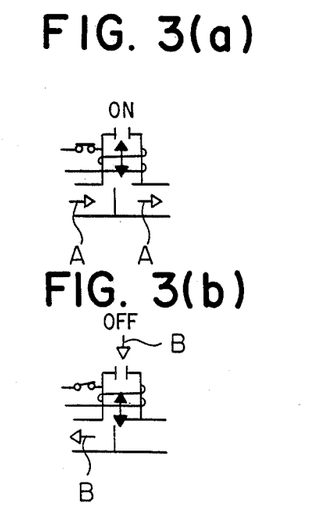
FIGS. 3(a) and 3(b) are schematic illustrations respectively showing the on and off states of the three-way valves of the embodiment of FIG. 1.

The opening and closing of solenoid valves 19, 20, 22, 23, 24, 26, 27, 28, 30, and 31 are controlled by control signals from the control unit 37. Solenoid valves 22, 23, 26, 27, 28, and 31 are three-way valves, and the two states thereof are illustrated in FIG. 3. FIG. 3(a) shows the state of each of the three-way valves when energized. In this state, compressed air moves along the pathway shown by the arrows marked A. FIG. 3(b) shows the state in which the three-way valves are off, and in this state, compressed air moves along the pathway shown by the arrows marked B.

Figures 4A, 4B:
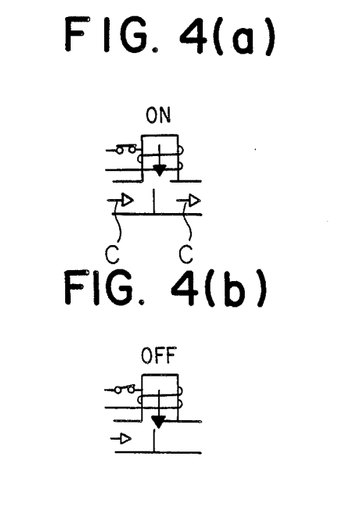
FIGS. 4(a) and 4(b) are schematic illustrations respectively showing the on and off states of the two-way valves of the embodiment of FIG. 1.

Solenoid valves 20, 24, and 30 are two-way valves. Their two operating states are shown in FIG. 4. FIG. 4(a) shows the state in which a two-way solenoid valve is energized. In this state, compressed air moves in the direction shown by the arrows marked C. FIG. 4(b) shows the state in which the solenoid valve is off. In this state, there is no flow of compressed air.

Figure 5:
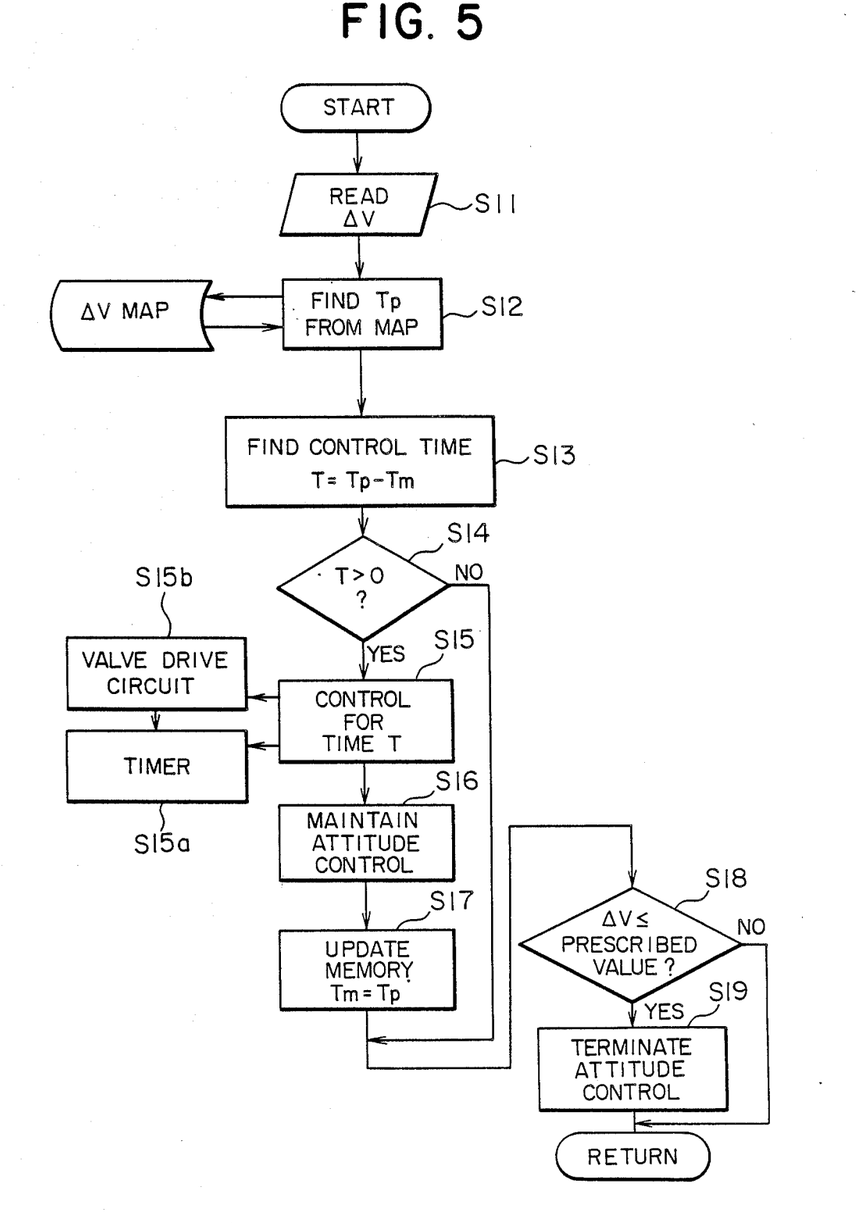
FIG. 5 is a flow chart showing the operation of the control unit of the embodiment of FIG. 1 when performing roll suppression.
Figure 6:
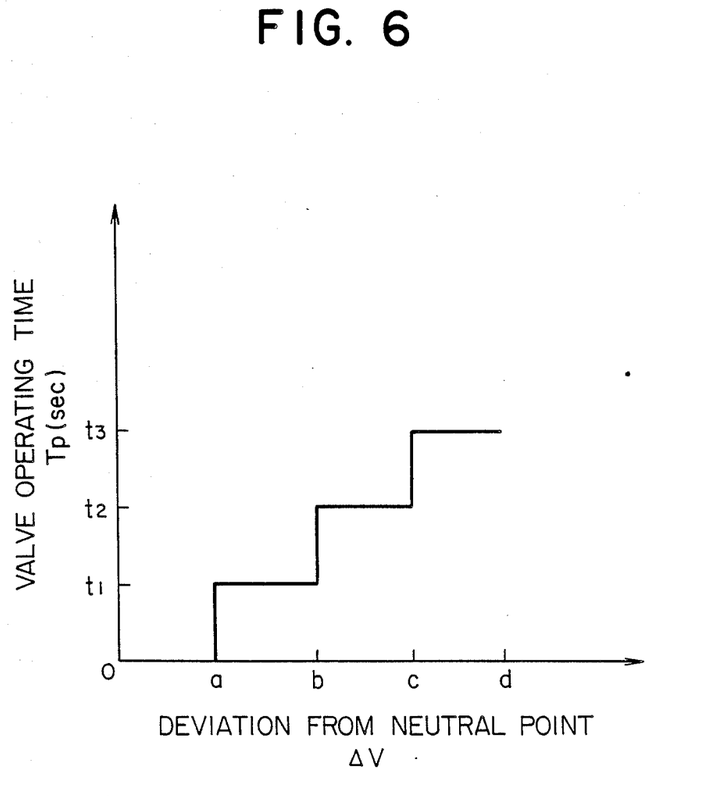
FIG. 6 is a graph of the relationship between valve operating time $T_p$ and the deviation $\Delta V$ of the output of the acceleration sensor 39 of the embodiment of FIG. 1 from a neutral point.

Next, roll suppression by the embodiment of a suspension control apparatus illustrated in FIG. 1 will be described while referring to FIG. 5, which is a flow chart of a control program performed by the control unit 37. First, in Step S11, the voltage V of the output signal from the acceleration sensor 39 is read by the control unit 37, and the deviation $\Delta V$ of the output V of the acceleration sensor 39 from a neutral point corresponding to zero lateral acceleration is computed. The program then proceeds to Step S12, in which a $\Delta V$ map like that shown in FIG. 6 which is stored in the control unit 37 is referred to and the valve operating time Tp is determined. Next, in Step S13, the control time $T = Tp - Tm$ is computed. The value of Tm is stored in a map in memory and indicates the length of time for which the valves have already been operated. When Step S13 is reached for the first time, Tm=0, so T is set equal to Tp. Then, Step S14 is performed, and it is determined whether T is greater than 0. In Step S14, if it is determined that T>0, then in Step S15, valve control is performed for control time T. The following table shows which valves are energized for each mode of control.

| | | | Front Air Supply Valve (20) | Rear Air Supply Valve (24) | Front Air Discharge Valve (28) | Rear Air Discharge Valve (31) | Air Supply Flow Control Valve (19) | Air Discharge Solenoid Valve (30) | Front Right Solenoid Valve (22) | Front Left Solenoid Valve (23) | Rear Right Solenoid Valve (26) | Rear Left Solenoid Valve (27) |
|---|---|---|---|---|---|---|---|---|---|---|---|---|
| 1 Roll Control | Right turn | Start | O | O | X | X | X | X | O | X | O | X |
| | | Retain | X | X | O | O | X | X | O | X | O | X |
| | | Release | X | X | X | X | X | X | X | X | X | X |
| | Left turn | Start | O | O | X | X | X | X | X | O | X | O |
| | | Retain | X | X | O | O | X | X | X | O | X | O |
| | | Release | X | X | X | X | X | X | X | X | X | X |
| 2 Nose Dive Control | | Start | O | X | X | X | X | X | X | X | O | O |
| | | Retain | X | X | X | X | X | X | X | X | X | X |
| | | Return | X | O | X | X | X | X | O | O | X | X |
| 3 Squat Control | | Start | X | O | X | X | X | X | X | X | X | X |
| | | Retain | X | X | X | X | X | X | X | X | X | X |
| | | Return | O | X | X | X | X | X | X | X | O | O |
| 4 Vehicle Height Control (Normal) | | Raise | O | O | X | X | O | X | X | X | X | X |
| | | Lower | X | X | O | O | X | O | O | O | O | O |
| 5 Rapid Vehicle Height Control | | Raise | O | O | X | X | X | X | X | X | X | X |
| 6 Closing of Left-Right Communication | | Retain | X | X | O | O | X | X | O | X | O | X |

O: conducting
X: not conducting

For example, during a right turn during which $\Delta V > 0$, the right side of the vehicle body attempts to rise, and the left side attempts to fall. In order to suppress this rolling motion, the valves marked with a O for a right turn in the above table are operated for control time T by an unillustrated valve drive circuit. As a result, compressed air from the high-pressure chamber 15a is supplied to the main air spring chambers 7 of the front and rear left suspension units FS1 and RS1 through the air supply flow control valve 19, front and rear air supply valves 20 and 24, and solenoid valves 23 and 27, and the left side of the vehicle body is prevented from falling. On the other hand, the compressed air in the main air spring chambers 7 of the front and rear right suspension units FS2 and RS2 is discharged through the front and rear right solenoid valves 22 and 26 and the front and rear air discharge valves 28 and 31 to the low-pressure chamber 15b. As a result, the right side of the vehicle body is prevented from rising. In the above manner, the tendency of the right side of the vehicle body to rise and of the left side to fall during a right turn is suppressed. When control of the valves for control time T is completed, the control unit 37 turns off the front air supply valve 20 and the rear air supply valve 24 in Step S16, and the supply of compressed air to the main air spring chambers 7 is stopped.

At the same time, in Step S16, the front and rear air discharge valves 28 and 31 are turned on, and the discharge of air from the main air spring chambers 7 is stopped. As a result, the previously-controlled attitude is maintained. Next, in Step S17, the map in memory is updated. Namely, the time Tp for which the valves were operated is stored as Tm (Tm=Tp). Then, in Step S18, it is determined whether $\Delta V$ is below a prescribed value. For example, during turning, when $\Delta V$ is larger than a prescribed value, Step S19, in which attitude control would be terminated, is skipped and Step S11 is returned to. On the other hand, if in Step S18 it is determined that $\Delta V$ is smaller than the prescribed value, all the valves are turned off, and the attitude control which was maintained in Step S16 is terminated. Thereafter, Step S11 is returned to, and in Step S12, Tp is found.

It can be seen from the above description that the value of $\Delta V$ is used to determine when to initiate and when to complete control of the suspension units in order to suppress rolling. Therefore, the accuracy of control depends on the accuracy of $\Delta V$. Ideally, the neutral point of the acceleration sensor 39 is a constant voltage, such as 2.5 volts, and if this were the case, $\Delta V$ could be calculated by the equation $\Delta V = V - 2.5$ volts. However, as mentioned earlier, the output of an acceleration sensor 39 is subject to gradual drift over long periods of time due to temperature variations, changes in the attitude of the vehicle body, or simple degradation so that the neutral point of the acceleration sensor will vary from its initial value (such as 2.5 volts) by an offset voltage $\pm V_{os}$. If $\Delta V$ is calculated simply by finding the difference between the initial neutral point and the present output V of the acceleration sensor 39, the value of $\Delta V$ will be inaccurate by the magnitude of the offset voltage $V_{os}$, and if roll suppression is performed using this inaccurate value of $\Delta V$, the roll suppression will not be uniform on both sides of the vehicle and satisfactory suspension control can not be performed.

Although the offset voltage $V_{os}$ of the sensor output V at a given acceleration may be large, the rate of change of the output with respect to acceleration (the slope of the curve in FIG. 2) is highly constant.

Accordingly, if the value of $V_{os}$ can be determined and compensated for, it is possible to perform accurate roll suppression over long periods of time.

Figure 7:
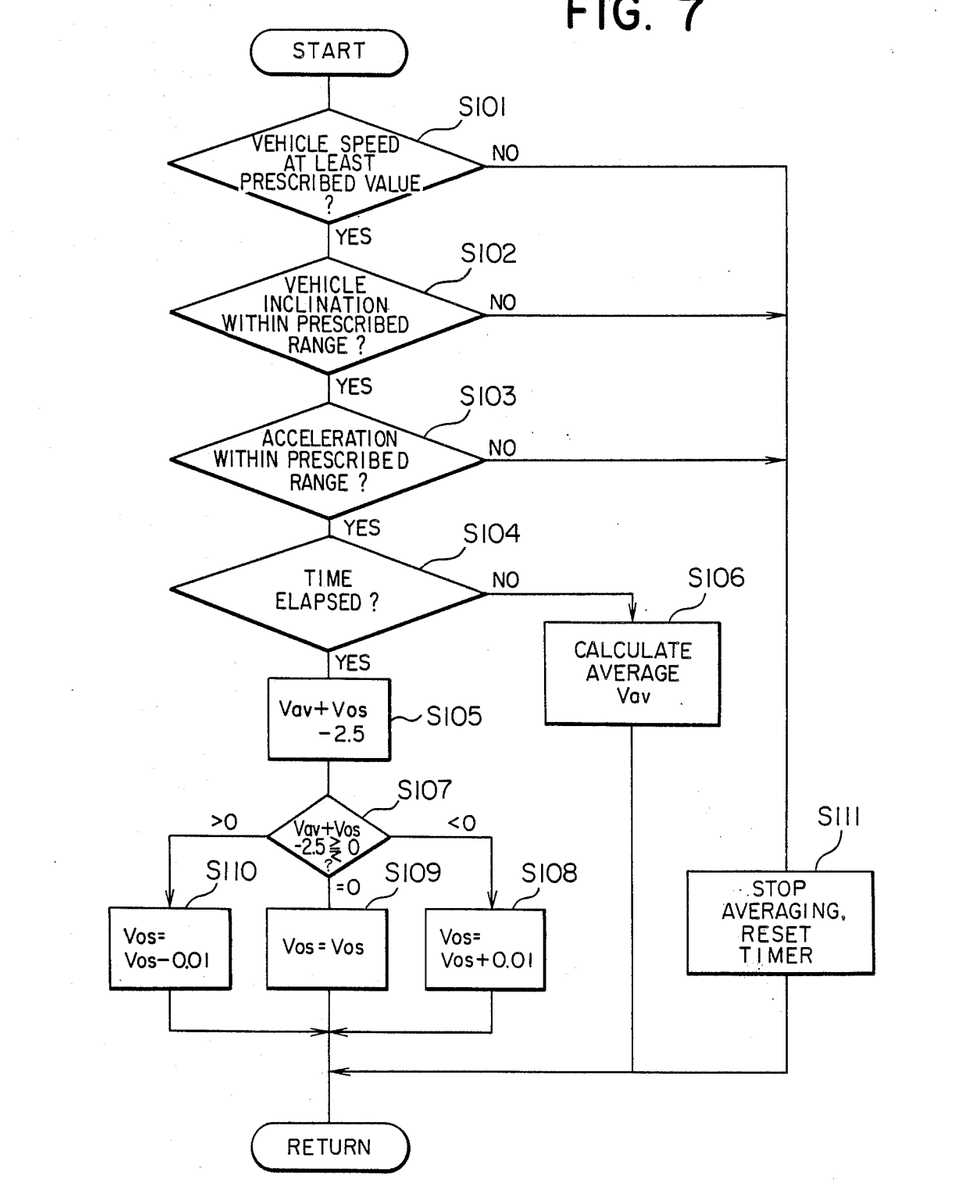
FIG. 7 is a flow chart of a routine performed by the control unit 37 in order to compensate for drift of the neutral point of the output of the acceleration sensor 39.

In the present invention, the control unit 37 determines and compensates for the offset voltage $V_{os}$ by a series of steps illustrated in the flow chart of FIG. 7. Offset voltage correction is performed when the control unit 37 determines that the vehicle body is level and that it is not undergoing lateral acceleration. If the vehicle is stopped on a level roadway, it will not be subject to any accelerations, and the neutral point of the output of the acceleration sensor 39 can be immediately corrected. However, it is difficult to confirm whether a vehicle is stopped on a level roadway.

Therefore, in accordance with the present invention, it is determined whether the vehicle body is level while the vehicle is traveling. The vehicle is determined to be traveling on a level roadway if the following three conditions are satisfied:

(1) The vehicle is traveling at a speed of at least 20 km/hour, (2) The difference in the heights of the right front portion and the left rear portion of the vehicle is at most a prescribed value, and (3) The lateral acceleration of the vehicle body as indicated by the deviation $\Delta V$ of the output of the acceleration sensor 39 is at most $\pm 0.2$ G.

Determination of whether these three conditions are satisfied is performed in Steps S101–S103, respectively, of FIG. 7. If these three conditions (1), (2), and (3) are satisfied, in Step S104, it is determined whether a prescribed period of time, such as 15 seconds, has elapsed since the three conditions were first satisfied. If the period has not elapsed, then in Step S104, the average $V_{av}$ of the output voltage V of the acceleration sensor 39 is calculated from the start of the period up to the present time. After the average $V_{av}$ is calculated, a return is performed. However, if it is determined in Step S104 that the prescribed period has elapsed, then averaging of V is completed, and in Step S105, the value of $(V_{av} + V_{os} - 2.5$ volts) is calculated, wherein $V_{os}$ is the previously-calculated value of the offset voltage $V_{os}$.

In Step S107, it is determined whether the result of the calculation $(V_{av} + V_{os} - 2.5$ volts) is positive, negative, or zero. If the result is negative, it is determined that the value of $V_{os}$ is too small, so in Step S108, the value of $V_{os}$ is increased to $V_{os} + 0.01$ volts.

If the result of the calculation in Step S105 is 0, then it is determined that the value of $V_{os}$ is correct, so in Step S109, $V_{os}$ retains its present value.

If the result of the calculation in Step S105 is positive, it is determined that the value of $V_{os}$ is too large, so in Step S110, $V_{os}$ is set equal to $V_{os} - 0.01$ volts. After Step S108, S109, or S110, a return is performed to Step S101.

When any one of conditions (1), (2) and (3) is not satisfied, Step S111 is performed, the averaging of the output of the acceleration sensor 39 is halted, and a timer which times for the prescribed period of 15 seconds is reset. A return is then performed.

By the series of steps illustrated in FIG. 7, the offset voltage $V_{os}$ is set at a value such that it can correct for any drift of the neutral point of the output of the acceleration sensor 39 from 2.5 volts. Then, if the deviation $\Delta V$ is calculated as $\Delta V = (V + V_{os}) - 2.5$ volts, the deviation $\Delta V$ will always reflect the actual lateral acceleration. As a result, roll suppression can be accurately performed over long periods of time.

In the above-described embodiment, the time period over which the output of the acceleration sensor 39 is averaged is set at 15 seconds. However, it is possible to have two time periods of different lengths and to use one period in a first speed range and the other period in a second speed range. For example, when the vehicle is traveling at a low speed, the period for averaging the output of the acceleration sensor 39 could be set at 15 seconds, and when the vehicle is traveling at a high speed, the period could be switched to 30 seconds. Switching between two different periods in this manner makes it possible to attain both good response and good stability.

It is also possible to employ a short time period such as 15 seconds when the deviation from a neutral acceleration is large and employ a long time period such as 30 seconds when the deviation is small with the same effects as described above.

In the above-described embodiment, the output signal of the acceleration sensor 39 is corrected on the basis of output signals indicating the heights of the front right and rear left portions of the vehicle body. However, correction can also be based on signals from height sensors on all four wheels or on the front right and front left wheels, an oil pressure signal from the power cylinder for power steering, a neutral steering position signal, a reset signal from a service switch which is operated by the driver, or the like. In addition, the control unit can be designed such that value of $V_{os}$ is stored in the memory when the engine is turned off and is used as a starting value when the engine is next turned on.

Although the present embodiment suppresses rolling by adjusting the supply of air to air suspension units, rolling suppression can also be performed by controlling the damping force or spring constant of a suspension unit, by controlling stabilizers, or by some other means.

What is claimed is:

1. A suspension control apparatus for an automotive vehicle comprising:
    attitude-adjusting means for adjusting the attitude of a body of a vehicle;
    an acceleration sensor which senses the acceleration of the vehicle body and produces a corresponding output signal, said output signal having a neutral point corresponding to no acceleration;
    correcting means for correcting the output of said acceleration sensor for drift of the neutral point from a predetermined value; and
    control means for controlling said attitude-adjusting means in accordance with the corrected output of said acceleration sensor so as to suppress a motion of the vehicle body caused by the acceleration which is sensed by said acceleration sensor.

2. A suspension control apparatus as claimed in claim 1, wherein said attitude-adjusting means comprises a plurality of adjustable suspension units each of which is disposed between a wheel of the vehicle and the vehicle body and supports the vehicle body with respect to the wheel.

3. A suspension control apparatus as claimed in claim 1, wherein said correcting means comprises means for determining the deviation of the neutral point of the acceleration sensor from the predetermined value when the vehicle is moving with the vehicle body substantially level.

4. A suspension control apparatus as claimed in claim 3, wherein said correcting means comprises:
    a speed sensor for sensing the speed of the vehicle;
    a height sensor for determining the difference in height between the right and left sides of the vehicle body;
    level-determining means responsive to said speed sensor and said height sensor for determining when the vehicle body is level while the vehicle is moving above a prescribed speed;
    means for finding the average output of the acceleration sensor for a prescribed period when said level-determining means determines that the vehicle body is level;
    means for finding the difference between the average output and the predetermined value of the neutral point; and
    means for combining the difference with the output of said acceleration sensor to obtain a corrected output.

5. A suspension control apparatus as claimed in claim 2, wherein said acceleration sensor is disposed so as to measure the lateral acceleration of the vehicle body and said control means controls said suspension units so as to suppress the rolling of the vehicle body.

6. A suspension control apparatus as claimed in claim 2, wherein said suspension units are fluid suspension units which can be made to expand and contract by controlling the supply of a fluid thereto.

7. A control apparatus for an automotive vehicle comprising:
    a plurality of adjustable fluid suspension units which can be made to expand or contract by respectively supplying or discharging a fluid therefrom, each of said suspension units being disposed between a wheel of a vehicle and a body of the vehicle and supporting the vehicle body with respect to the wheel;
    fluid-supply means for supplying a pressurized fluid to said suspension units;
    an acceleration sensor which senses the lateral acceleration of the vehicle body and produces a corresponding output signal, said output signal having a neutral point corresponding to no acceleration;
    a speed sensor which senses the speed of movement of the vehicle;
    a height sensor which senses the difference between the heights of the left and right sides of the vehicle body;
    correcting means for correcting the output of said acceleration sensor for drift of the neutral point from a predetermined value; and
    control means responsive to said speed sensor, said height sensor, and the corrected output from said correcting means for calculating the rolling condition of the vehicle body caused by the lateral acceleration of the vehicle and controlling said fluid supply means so as to suppress the rolling of the vehicle body.

* * * * *